Dec. 8, 1925.

P. N. LANDINE

COWL VENTILATOR

Original Filed Sept. 9, 1922

1,564,251

INVENTOR
Peter N. Landine
BY Mitchell Brothers.
ATTORNEY

Patented Dec. 8, 1925.

1,564,251

UNITED STATES PATENT OFFICE.

PETER N. LANDINE, OF MILFORD, CONNECTICUT.

COWL VENTILATOR.

Original application filed September 9, 1922, Serial No. 587,190. Divided and this application filed June 14, 1923. Serial No. 645,283.

*To all whom it may concern:*

Be it known that I, PETER N. LANDINE, a citizen of the United States of America, residing at Milford, Connecticut, have invented a new and useful Cowl Ventilator, of which the following is a specification.

My invention relates to a ventilator, and is particularly adapted for, and will be described as, an automobile cowl ventilator. This application is a division of my co-pending application #587,190, filed September 9, 1922.

It is an object of my invention to provide a ventilator for attachment to a cowl in which the joint made with the sheet metal covering of the cowl will be smooth and unmarred.

It is a further object to provide a ventilator which may be securely attached to the cowl without the use of rivets.

Briefly stated, a preferred form of my invention includes a frame member which is positioned adjacent the ventilator opening in the sheet metal covering of the cowl. The edge of the metal adjacent the aperture is lapped about the frame, and a second frame abuts the lapped-over end and is secured to the first-mentioned frame, so that the edge of the sheet metal covering is sandwiched in between and held by the two frames. A ventilator cover is supplied, and is preferably pivoted to one of the frame members, and provision is made for actuating the ventilator cover.

The drawings forming part of this specification show, for illustrative purposes only, a preferred form of my invention. In said drawings—

Figure 1:
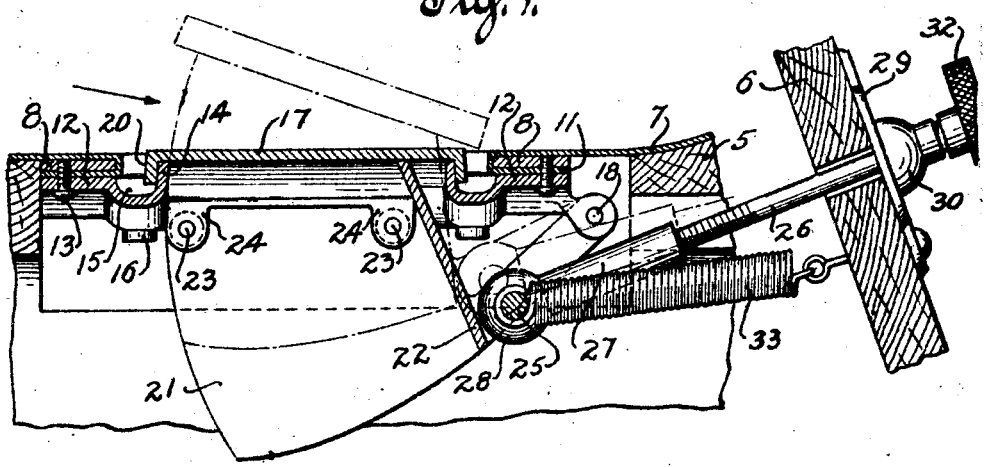
Figure 1 is a sectional view of a cowl ventilator, illustrating features of my invention and showing only sufficient of the vehicle body to permit understanding of the invention.
Figure 2:
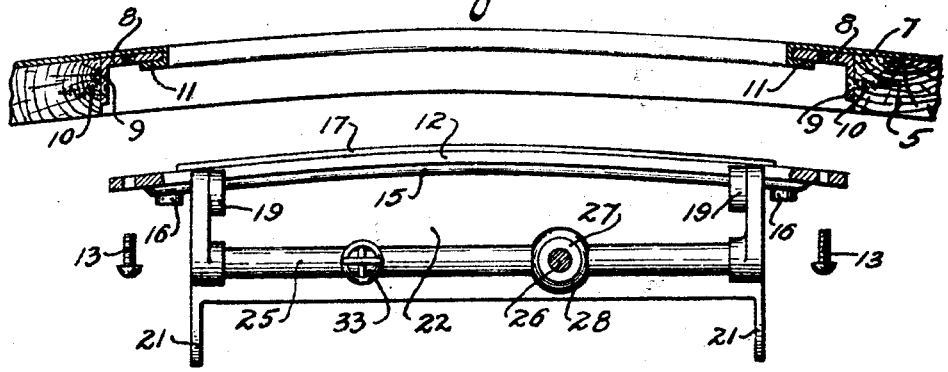
Figure 2 is a sectional view, taken in a plane at right angles to that of Fig. 1, parts being shown relatively separated.

In said drawings, 5 indicates conventionally the cowl of an automobile, while 6 indicates a fragment of the dash. The cowl is formed of or covered with sheet metal 7, as is usual in motor vehicles, and a ventilator opening is provided in the cover 7 and in the wooden part of the cowl (when such part is used).

A frame 8, having flanges 9—9 at opposite sides, is positioned adjacent the ventilator opening and may be secured to the body portion 5 by means of screws 10—10 passing through the flanges. The aperture in the covering 7 is slightly smaller than the opening of the frame 8, and the free edge of the metal defining the aperture is lapped over the frame 8, as indicated at 11—11, so as to form a perfectly smooth and finished ventilator opening about the frame.

A second frame 12 is secured to the frame 8, as by means of screws 13—13 passing through suitable apertures in the frame 12 and taking into threaded apertures in the frame 8. The frame 12 abuts against the inturned edge of the cowl covering, and the inturned edge will therefore be sandwiched in between and securely held by the two frames when the latter are secured together.

The frame 12 preferably has a continuous upstanding lip 14, which serves as a seat for the ventilator cover and defines one side of a gutter or drain 15, which may discharge into suitable drain pipes (not shown) connected to the drain bosses 16.

A ventilator cover member 17 may be pivotally mounted at 18 to lugs 19—19 extending from the frame 12. The cover proper may have a downturned flange 20, for overlapping the upstanding lip 14 and providing a tight joint. Cheek plates 21—21 and a rear deflector plate 22 may be secured to the under side of the top cover, by means of screws 23—23 extending into lugs 24—24 on the top cover, and arms extending from the plates and pivoted to the lugs 19, at 18, serve to pivotally support the cover 17.

A bar 25 is mounted on and extends between the cheek plates 21—21. Suitable operating means, such as a push rod 26, co-operate with the bar 25 and, in the form shown, the rod 26 is in screw-threaded engagement with a sleeve 27 carrying an enlargement 28, which surrounds and is slidably mounted on the bar 25. The push rod 26 is preferably fixed against longitudinal movement, but is rotatably mounted on the dash 6, and in the present disclosure the dash is provided with a suitable aperture 29 through which the rod 26 extends, and on the front of the dash is mounted a plate 30 for receiving a ball (not shown) on the rod 26. A knob or handle 32 is fixed at the inner end of the rod 26, whereby the latter may be rotated. If desired, a spring 33 may be secured to the bar 25 and to the dash, for constantly urging the ventilator cover toward the closed position.

It will be obvious that, with the rod 26 fixed against longitudinal movement, rotation of the rod will cause the sleeve 27, enlargement 28 and, through these elements, the bar 25, to move. When the bar 25 is pushed toward the left as viewed in Fig. 1, the ventilator cover is opened, and conversely, when the rod 26 is rotated so as to move the bar 25 to the right, the ventilator cover will be closed. The enlargement or boss 28 is slidably mounted on the bar 26, so that it may be slid along the bar and, no matter where the boss is situated upon the bar 25, the cover member may be operated.

It is apparent that with the arrangement described the cowl ventilator control on the dash or other member may be situated at any convenient point which may be available, and that, if the location of the control is to be changed, no change is necessary in the ventilator proper nor its mounting, since the boss 28 may be slid along on the bar 25 and, regardless of the position of the boss on the bar, the ventilator cover may be operated.

The cowl ventilator above described may be readily and securely attached to the cowl covering without the use of rivets; the edge of the finished ventilator aperture will be smooth, and the cover and frames may be arranged to fit flush.

While I have described a preferred form of my invention, I wish it understood that various features of my invention may be changed without departing from the spirit of my invention as defined in the appended claims.

I claim:

1. In a cowl ventilator, a frame having a drain channel thereon, a second frame to be secured to said first mentioned frame for holding part of a sheet metal cowl between said frames, a ventilator cover pivotally mounted on one of said frames and seating on one side of said drain channel, and means for actuating said ventilator cover.

2. In a cowl ventilator and in combination with a sheet metal cowl having a ventilator opening therein, two frames to be secured together and hold the edge of the sheet metal defining the ventilator opening between them, said frames being mounted below the main body of the sheet metal cowl adjacent the opening therein, one of said frames having a drain channel therein, a ventilator cover pivotally mounted on one of said frames and adapted to seat over one side of said drain channel, the top of said ventilator cover when in closed position being substantially flush with the main body of the cowl, and actuating means for said ventilator cover.

3. In a cowl ventilator and in combination with a vehicle having a sheet metal covering with a ventilator aperture therein, a frame member having the metal covering adjacent the ventilator aperture lapped therearound, a second frame member secured to said first-mentioned frame member and abutting the lapped-around edge of said sheet metal covering whereby the edge of said covering is sandwiched between and held by said two frame members, a ventilator cover, and means for operating said cover.

4. In a cowl ventilator and in combination with a motor vehicle having a cowl covered with sheet metal, said sheet metal having a ventilator aperture, a frame secured to said cowl below the sheet metal and adjacent said aperture, the edge of the metal adjacent the aperture being folded over beneath said frame, a second frame abutting said folded-over edge and secured to said first-mentioned frame whereby the lapped-over edge is held by and between said two frames, a ventilator cover, and means for operating said cover.

PETER N. LANDINE.